June 12, 1928.
W. J. BESLER
1,673,177
BRAKE MECHANISM FOR MOTOR VEHICLES
Filed June 18, 1927
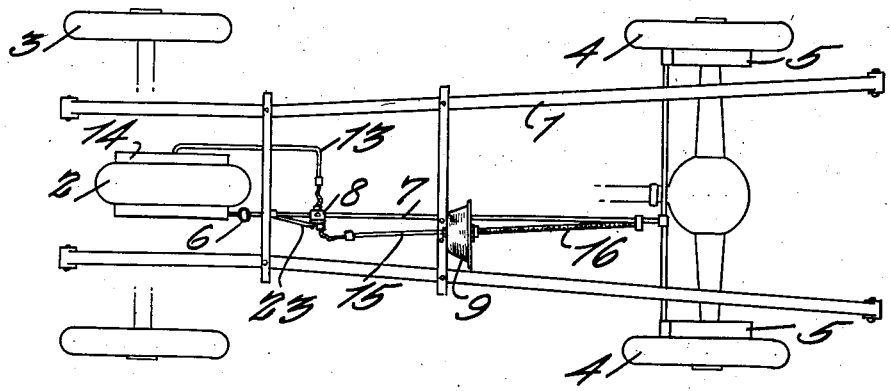
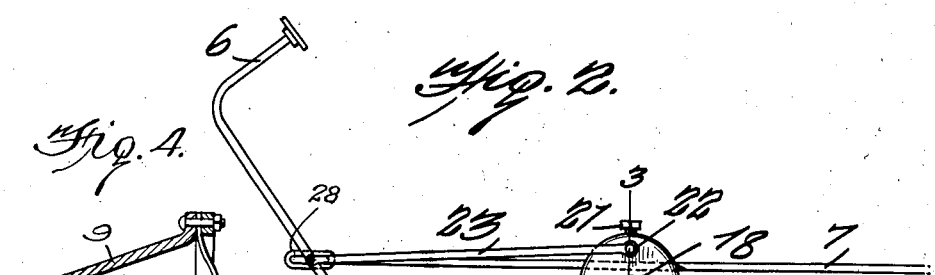
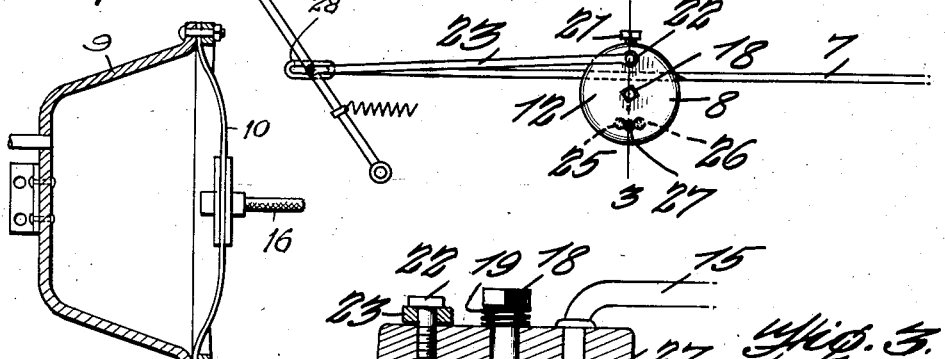
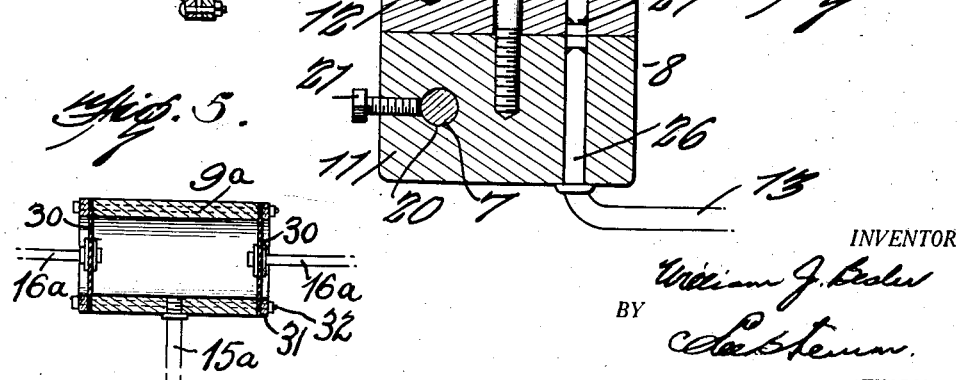
INVENTOR.
William J. Besler
BY
ATTORNEY.

Patented June 12, 1928.

1,673,177

UNITED STATES PATENT OFFICE.

WILLIAM J. BESLER, OF PLAINFIELD, NEW JERSEY.

BRAKE MECHANISM FOR MOTOR VEHICLES.

Application filed June 18, 1927. Serial No. 199,801.

My invention relates to brake mechanism for motor vehicles and more particularly to brake mechanism of the fluid-pressure operated or servo-motor type arranged to be operated by the internal combustion engine of such vehicles and of simple and reliable construction and efficient in its operation.

It has been proposed to operate braking mechanism of this character by the source of power represented in the reduced pressure or partial vacuum of the intake manifold of the engine. There are certain requirements to be fulfilled however to make such a system practicable. For example, the controlling valve, braking motor and other elements of the system must be constructed to remain air-tight for long periods of use or even abuse with little or no attention, adjustment or lubrication.

Furthermore, the arrangement of the system must be such that the brakes may be gradually or quickly applied, at the will of the operator, and gradually or quickly released. The extent of application or release of the brakes must be easily controlled, preferably depending upon the extent of movement of the controlling lever, and should not depend upon the adjustment or positioning of a complicated mechanical structure which might fail or become deranged. However it should be possible to supplement the braking effect of the servo-motor through the direct and continued actuation of the controlling lever, if necessary.

As a matter of practical design, the braking mechanism should not require rearrangement of the brake and its operating elements, and should preferably be readily applicable to a vehicle equipped with ordinary brakes.

It is an object of my invention to provide a braking mechanism which has the above-mentioned characteristics. Simplicity and reliability are attained without sacrificing the necessary operating characteristics.

Another object of my invention is to provide a braking mechanism having a controlling valve secured to and supported by the brake rod or other movable element of the ordinary braking system in such manner that the adjustment of the valve is under the joint control of the controlling lever and the brake rod. A movement of the controlling lever which is sufficient to operate the valve renders the servo-motor operative but the resultant movement of the brake rod recloses and seals the valve. A gradual application of the brakes may be made, therefore, by utilizing the movement of the brake rod and without complicated controls or adjuncts for the valve.

A further object of my invention is to provide a braking mechanism which may under certain conditions be jointly controlled by a servo-motor and by manual or pedal effort; the servo-motor being so adjusted that it will almost but not quite lock the wheels of the vehicle in motion, at high speed under ordinary traction conditions, and the controlling lever being arranged to supplement the braking effort of the servo-motor.

The maximum effective braking action upon a moving vehicle is obtained just before the wheels "lock"; so that the ordinary servo-motor brake, which is powerful enough to lock the wheels, is not only needlessly destructive of tires and brakes but is actually less effective in an emergency than if it were unable to lock the wheels. The braking mechanism according to my invention is subject to less strain and wear, and operates more effectively, as the servo-motor cannot lock the wheels unless supplemented by pressure on the controlling lever.

Other objects and advantages of my invention will appear from the following detailed description of a preferred embodiment thereof shown on the accompanying drawings.

Referring to the drawings, Fig. 1 is a plan view of a conventional automobile chassis with the improved braking mechanism applied thereto;

Fig. 2 is a side view to an enlarged scale of the brake pedal and brake rod shown in Fig. 1, with the controlling valve mounted on the rod;

Fig. 3 is a detail view of the controlling valve, showing the arrangement of ports and the manner in which the valve is mounted upon the brake rod;

Fig. 4 is a detail view to an enlarged scale of the servo-motor shown in Fig. 1; and Fig. 5 is a detail view of a modified form of servo-motor.

Referring to Fig. 1, a fluid-pressure braking mechanism embodying my invention may be applied to an automotive vehicle shown conventionally on the drawings and comprising a frame 1, an internal combustion engine 2, front and rear wheels 3 and 4, respectively, and brakes 5 cooperating with the rear wheels. My invention is not concerned with the particular construction or arrangement of chassis or brakes and may be applied to brakes operating upon the transmission shaft or upon all four wheels of the vehicle.

The braking mechanism in general comprises, in addition to the usual brake pedal or control lever 6 and brake rod 7 connected thereto, a controlling valve 8 secured to and carried by the brake rod 7 and a brake motor or operating device 9 controlled by said valve. The valve 8 comprises two relatively movable members 11 and 12, one of which is connected through a pipe connection 13 with the intake manifold 14 of the engine 2 and the other through a pipe connection 15 with the chamber of the brake motor 9. The brake motor 9, when rendered operative by the controlling valve 8, applies the brakes 5 through an auxiliary brake rod or cable 16.

The brake motor 9, as shown in Fig. 4, comprises a flexible diaphragm 10, for example of leather or rubber suitably reinforced, which is secured to the brake cable 15. The movement of the diaphragm, as will be readily understood, is effected by variations in the fluid pressure in the motor depending upon the connection of the motor chamber through the valve 8 to the intake manifold or to atmosphere. It is obvious that by reversal of the diaphragm a source of fluid pressure higher than atmospheric pressure may be employed.

In the case of four-wheel brakes, a brake motor 9ª shown in Fig. 5 may be employed. The brake motor 9ª comprises a hollow cylindrical shell, to the opposite ends of which are secured two flexible diaphragms 30, as for example, by means of clamping rings 31 and bolts 32. The diaphragms 30 are of rubber or leather and are arranged to control the front-wheel brakes and the rear-wheel brakes, respectively. With this form of brake motor, equal or proportional forces are exerted on the separate sets of brakes and the reactions of the diaphragms tend to oppose each other so that the motor need not be secured in position as rigidly as would otherwise be necessary, as substantially no wrenching or twisting action is exerted on the motor support.

The members 11 and 12 of the controlling valve 8, as clearly shown in Fig. 3, are pivotally related. A convenient way of accomplishing this result is to provide a bolt 18 which passes loosely through the member 12 into threaded engagement with the member 11. A compression spring 19 surrounds the bolt 18 and holds the members 11 and 12 in air-tight engagement. These valve members may be turned from a small metal block and the engaging surfaces are then ground so that an air-tight joint will be made. In operation, one member is rocked or twisted slightly with respect to the other, the flat polished surface of one member sliding over that of the other. A light lubricating oil may be used between the two members but frequent lubrication is unnecessary, as the valve members are found to remain in operative condition for indefinite periods without attention.

The valve member 11 is perforated at 20 to receive the brake rod 7, a locking bolt 21 being provided to secure the member 11 on the brake rod and also to provide initial adjustment by sliding the valve along the rod. The valve member 12 is suitably connected, as by a pin 22, to a rod 23 which is secured to the brake pedal 6 in such manner that depression of the pedal moves the valve member 12 with respect to the cooperating member 11 to operate the valve and render the brake motor 9 operative.

The adjustability of the valve 8 along the brake rod is an important feature of my invention. It renders the valve readily applicable to different braking systems and the initial installation and adjustment is a simple matter. A slight forward or backward adjustment of the valve on the brake rod varies the response or operating characteristics of the valve under the control of the brake pedal so that the operation may be modified to meet the requirements of different applications.

The valve member 11 has drilled therein two holes 25 and 26, serving as port openings, one of which is open to the atmosphere and the other connected through the pipe connection 13 with the intake manifold 14 or other source of power. The holes 25 and 26 are preferably filed or milled out at the bottom to form slots as indicated. The valve member 12 is provided with a single port opening 27 which, in the normal position of the brake mechanism when released, lies slightly forward of the "vacuum" port opening 26, as shown in Fig. 2. Thus, when the brakes are released, the port 27 lies between the ports 25 and 26 or slightly overlapping the atmospheric port 25, so that there is no tendency to establish an operating pressure in the servo-motor 9. Depression of the brake pedal 6 will now cause such relative movement of the valve members 11 and 12 as to bring the port openings 26 and 27 into alignment and render the brake motor operative; the resulting movement of the brake rod 7 will cause an opposite relative movement of the valve members 11 and 12.

A lost-motion connection 28 is provided between the brake pedal 6 and the brake rod 7 to permit initial operation of the brakes by the servo-motor mechanism; but continued depression of the brake pedal will supplement the braking effort exerted by the servo-motor mechanism. It will be understood that the servo-motor mechanism operates so quickly that it is impossible to obtain appreciable manual brake application until the servo-motor has been rendered fully operative. Preferably the servo-motor mechanism is so adjusted with respect to the weight of the vehicle, size of the brakes, etc., that it will exert almost but not quite enough braking effort to lock the wheels when the vehicle is in motion at high speed under ordinary traction conditions. Increased braking effort is available, if necessary, by increased manual pressure on the brake pedal.

In operation, if it is desired to apply the brakes, the pedal 6 is depressed by the foot of the operator, thereby rocking the valve member 12 until the port openings 26 and 27 register, as shown in Fig. 3, and the brake motor is rendered operative. The operation of the brake motor applies the brakes and, in so doing, moves the brake rod 7 forward, restoring the valve members 11 and 12 to normal relative positions and sealing the port openings 26 and 27. The brakes may therefore be applied gradually and the degree of application is dependent upon the extent to which the brake pedal is depressed. When the brake pedal is released, the valve member 12 is rocked until the port openings 25 and 27 register, connecting the brake motor to atmosphere and releasing the brakes.

It will be apparent that the described construction is simple and effective, readily applicable to any vehicle and capable of functioning properly over extended periods of time with little or no attention and adjustment. Various modifications of the specific structure disclosed which come within the scope of my invention may occur to those skilled in the art and therefore I desire that the invention shall not be limited in scope except as limitations are set forth in the appended claims.

I claim:

1. In brake mechanism for motor vehicles, a system of connected elements which includes an operating lever, an operating rod for manually applying the brakes with a lost motion connection to said lever, a fluid-pressure motor for operating the brakes and having an operative connection therewith and a valve for controlling the operation of the motor, said valve being supported upon and movable with the operating rod, and having a direct controlling connection with the operating lever of the brake system so that initial movement of said lever in the direction to apply the brakes will operate the valve to energize the fluid-pressure motor.

2. In brake mechanism for motor vehicles, a system of connected elements which includes an operating lever, an operating rod for manually applying the brakes with a lost-motion connection to said lever, a fluid-pressure motor for operating the brakes and having an operative connection therewith and a valve for controlling the operation of the motor, said valve being supported upon and movable with the operating rod, and comprising two relatively movable members, one of which is fixed to the supporting rod and the other is mounted upon the first member for rotation by a direct controlling connection with the operating lever of the brake system so that initial movement of said lever in the direction to apply the brakes will operate the valve to energize the fluid-pressure motor.

3. In brake mechanism for motor vehicles, a system of connected elements which includes an operating lever, an operating rod for manually applying the brakes with a lost-motion connection to said lever, a fluid-pressure motor for operating the brakes and having an operative connection therewith and a valve for controlling the operation of the motor, said valve being supported upon and movable with the operating rod, and comprising two relatively movable ported members, one of which is fixed to the supporting rod, and is provided with two transversely extending ports one of which is connected at its outer end to a suitable source of fluid pressure and the other is open to atmosphere, the second valve member being pivotally mounted upon the first member and provided with a single transverse port connected at its outer end with the fluid-pressure motor, and a direct controlling connection between the second valve member and the operating lever of the brake system, so that initial movement of the said lever in a direction to apply the brakes, will rotate the second valve member to establish a registry of ports to energize the fluid-pressure motor.

4. In brake mechanism for motor vehicles, a system of connected elements which includes an operating lever, an operating rod for manually applying the brakes with a lost-motion connection to said lever, a fluid-pressure motor for operating the brakes and having an operative connection therewith, a source of fluid pressure lower than atmospheric pressure and a valve for controlling the connection of said fluid-pressure motor to said source to apply and release the brakes by power, said valve being supported upon and movable with the operating rod and having a movable member mechanically connected to the operating lever of the brake system so that initial movement of said lever in the direction to apply the brakes will actuate the valve.

5. A brake mechanism for motor vehicles comprising a brake, a brake-applying lever, a brake rod extending from said lever to the brake, a power-actuating device for the brake, a valve member secured to the brake rod to be supported thereby, said valve member being provided with two port openings, a source of reduced pressure connected to one of said port openings, the other being open to the atmosphere, a second valve member movably supported on the first-mentioned valve member and provided with a single port opening adapted to cooperate with the port openings therein, said last-mentioned port opening being connected to said power-actuating device and an operating connection between said second valve member and the brake-applying lever.

6. A brake mechanism for motor vehicles comprising a brake, a brake-applying lever, a brake rod extending from said lever to the brake, a power-actuating device for the brake, a control valve adjustably secured as a unit to the brake rod to be supported thereby and arranged to control said power-actuating device and an operative connection between said valve and said brake-applying lever whereby adjustment of said valve along said brake rod varies the operating characteristics of the brake system.

WILLIAM J. BESLER.